April 17, 1945.  O. W. BONNAFE  2,373,995
BROACHING MACHINE
Filed Jan. 25, 1944    2 Sheets-Sheet 1
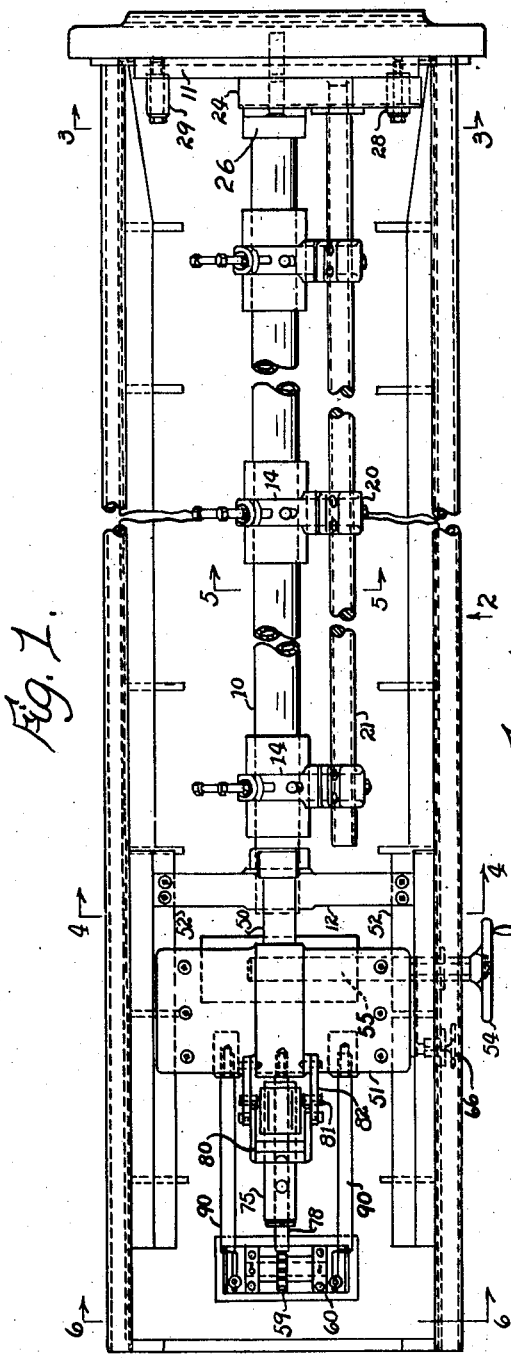
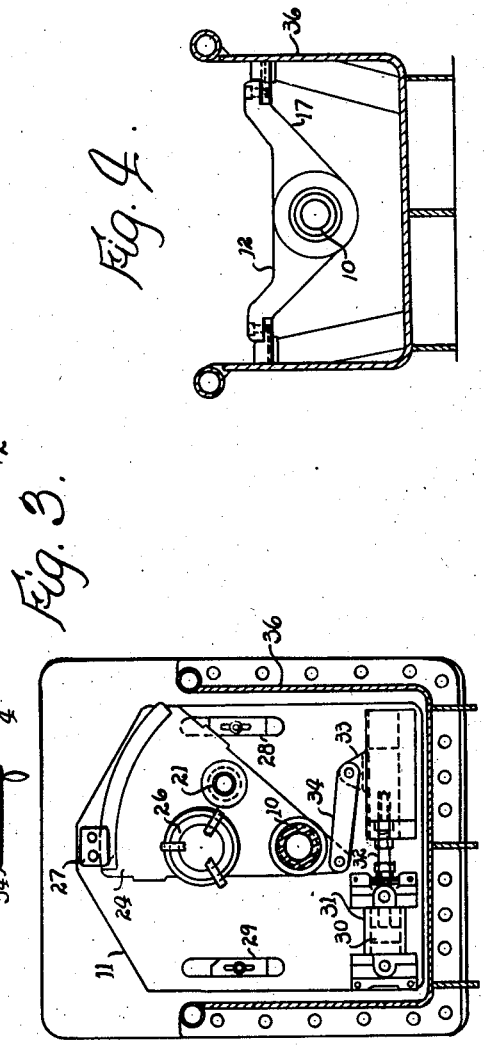
INVENTOR.
Oliver W. Bonnafe.
BY ATTORNEY April 17, 1945. O. W. BONNAFE 2,373,995
BROACHING MACHINE
Filed Jan. 25, 1944 2 Sheets-Sheet 2
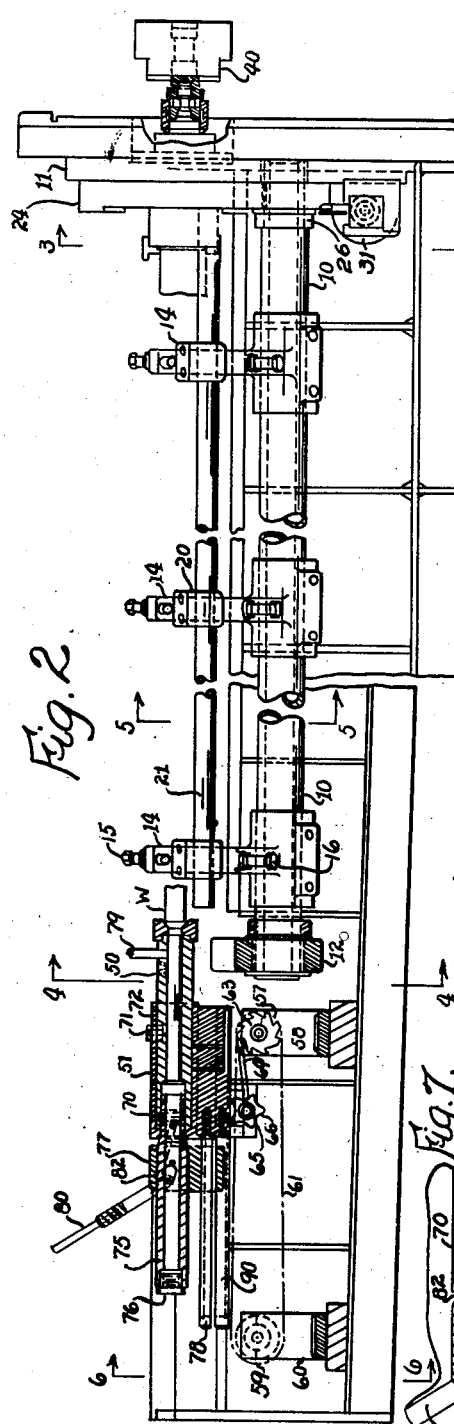
INVENTOR.
Oliver W. Bonnafe
BY ATTORNEY Patented Apr. 17, 1945

2,373,995

UNITED STATES PATENT OFFICE 2,373,995

BROACHING MACHINE

Oliver W. Bonnafe, Hudson, Mass., assignor to The La Pointe Machine Tool Company, Hudson, Mass., a corporation of Maine Application January 25, 1944, Serial No. 519,671

6 Claims. (Cl. 90—33)

This invention relates to a work holder particularly designed for use in broaching machines.

It is the general object of my invention to provide a holder in which tubular work may be conveniently supported and moved from loading position to broaching position and vice-versa.

A further object is to provide a work holder in which a broach-return tube is moved into operative position as the work is moved to loading position. I also provide improved operating means for moving the work holder, and improved devices for centering the work and supplying lubricant thereto.

A preferred form of the invention is shown in the drawings, in which

Fig. 1 is a plan view of my improved work holder;

Fig. 2 is a front elevation, partly in section, looking in the direction of the arrow 2 in Fig. 1;

Figs. 3, 4, 5 and 6 are transverse sectional views, taken along the lines 3—3, 4—4, 5—5 and 6—6 respectively in Figs. 1 and 2; and Fig. 7 is an enlarged side elevation of certain parts appearing in Fig. 2.

Referring to the drawings, my improved work holder comprises a tubular main shaft 10 (Fig. 2) having a bearing at the head end in a fixed plate 11 and at the opposite end in a fixed cross girt 12. Work supporting brackets 14 (Figs. 1 and 5) are clamped in spaced relation on the main shaft 10 and are provided with screws 15, 16 and 17 (Fig. 5) which may be adjusted to engage and center a piece of tubular work W of any desired size within the capacity of the machine. It will be understood that as many of the brackets 14 are supplied as may be necessary for the work to be handled. Each bracket 14 is provided with a clamping portion 20 to receive and hold a return tube 21, which tube is of such internal diameter as will permit the broach to slide freely therethrough.

A swinging head plate 24 (Figs. 2 and 3) is keyed to the main shaft 10. The end of the shaft extends beyond the plate 24 and is rotatably supported in a bushing in the fixed plate 11. The swinging plate 24 receives one end of the return tube 21 and has an opening therethrough aligned with the tube. The plate 24 also has a holding chuck 26 to receive and center one end of the work W which is supported and positioned by the screws 15, 16 and 17 in the brackets 14. A guide 27 on the fixed plate 11 holds the swinging plate 24 in sliding engagement therewith, and stops 28 and 29 limit swinging movement of the plate 24 in both directions.

The means for swinging the plate 24 and the work support associated therewith comprise a piston 30 (Fig. 3) slidable in a cylinder 31 and connected by a rod 32 to a slide 33, which slide in turn is connected by a link 34 to the lower end of the plate 24. Admission of oil under pressure to one end or the other of the cylinder 31 will swing the plate 24 from the operative position shown in Fig. 3 to the loading and broach-return position in which the plate 24 engages the stop 29, or vice versa.

A suitable hollow casing member or trough 36 extends the length of the machine and encloses the working parts on three sides thereof, as clearly shown in Figs. 3 to 6. When the work W and chuck 26 are in broaching position, the work is aligned with the broach puller head 40 shown in Fig. 2, the connection being such that the broach may be pulled through the work and that lubricant may be simultaneously discharged from the work.

A hollow tail center 50 (Figs. 1 and 2) is mounted to slide axially in a tail carriage 51, which carriage is itself longitudinally slidable on guideways 52 (Figs. 1 and 6) on the casing member 36, and to which guideways the cross girt 12 (Figs. 1 and 4) is also secured.

The carriage 51 may be moved longitudinally of the machine by means of a hand wheel 54 (Fig. 1) connected by a shaft 55 (Fig. 6) to a sprocket 57 (Fig. 2) supported in a fixed bracket 58. A similar sprocket 59 is mounted in a second fixed bracket 60, and the sprockets 57 and 59 support a sprocket chain 61 to which the tail carriage 51 is secured. By turning the hand wheel 54, the chain may be moved longitudinally to advance or retract the carriage 51 with respect to the work W.

A ratchet 63 is fixed to the shaft 55 and is engaged by a pawl 64 mounted on a pivot 65 on the casing member 36. The pawl is provided with a knob 66 by which it may be lifted to release the ratchet.

A spring 70 is inserted between the rear end of the tail center 50 and a shoulder in the carriage 51. Longitudinal movement of the tail center 50 in the carriage 51 is limited by a stud 71 (Fig. 2) extending into a short notch 72 in the tail center 50.

When the carriage and tail center are moved up by the hand wheel 54, the tail center will engage the end of the work W and the spring 70 may then be compressed until the latch 64 drops into a notch in the ratchet 63, thus holding the tail center with yielding pressure against the end of the work to center and support the same.

A tubular extension 75 is slidable in the rear end of the tail center 50 (Fig. 7) and is closed at its outer end by a plug 76. The tubular extension 75 is clamped in a block 77 slidable on a guide-rod 78 extending rearward from the carriage 51.

When the parts are aligned as shown in Fig. 6, the tubular extension 75 may be advanced into the rear end of the tail center 50 and may be secured by a hand lever 80 which is connected by links 82 to the carriage 51. When the lever 80 is swung to the left in Fig. 1, the spaced ends of the lever will engage studs 83 (Fig. 7) in the extension 75 and will force the part 75 firmly into the tail center 50, where it is held by the toggle action of the hand lever 80 and links 82. A tight connection is thus established between the extension 75 and the tail center 50.

The machine and work holder are operated as follows: After a piece of work W is completed and the broach has cleared the right-hand end of the work and the swinging plate 24, the hand lever 80 is swung to the right in Fig. 2 to release the tubular extension 75, which may then be withdrawn by sliding the block 77 rearward along its guide rod 78. When the right-hand end of the extension 75 clears the carriage 51, the block 77 may be swung sidewise, so that it will not axially obstruct the return of the broach through the hollow tail center. Fixed studs 90 act as stops to limit the swinging movement of the block 77. The holding pawl 64 is then released and the carriage 51 is moved to the left in Fig. 2 far enough to clear the adjacent end of the work W.

Pressure is then admitted to the cylinder 31 to swing the plate 24 and the work holder to the left in Fig. 3 to align the return tube 21 with the broach and puller head 40. The broach may then be returned to the left through the tube 21 and the hollow tail center 50, and a new piece of work may be inserted in the supporting brackets 14 and chuck 26.

Pressure is then admitted to the opposite side of the cylinder 31 to return the work holder to the position shown in Fig. 3, after which the tail center 50 is advanced to engage and center the work, and the reduced puller end of the broach is pushed through the work until it engages the puller head 40, in which position the broach itself is disposed in the hollow tail center 50 or may even extend somewhat to the left thereof.

The tubular extension 75 is then swung into alignment with the tail center 50 and is pushed forward to the position shown in Figs. 2 and 7, in which position it is secured by the toggle action of the lever 80 and links 82. The machine is then in condition for the next broaching operation, during which oil under pressure will be supplied to the tail center 50 through a supply pipe 79. After flowing through the longitudinal channels between the lands of the broach, the lubricant is discharged into the casing or trough 36 at the right-hand end of the work.

I have thus provided a work holder by which long and heavy pieces of work may be conveniently supported for broaching and having provision by which the work may be swung to loading position, while at the same time the return movement of the broach is guided by a return tube operatively aligned.

Having thus described my invention and the advantages thereof, I do not wish to be limited to the details herein disclosed, otherwise than as set forth in the claims, but what I claim is:

1. In a work holder for a broaching machine, a fixed supporting structure, a hollow tail center movable along a fixed axis in said structure to engage and center the work when the latter is in broaching position only, a slidable carriage for said tail center, a tubular extension insertable in the rear end of said tail center, a support for said tubular extension on which said extension may be moved transversely out of alignment with said tail center and means to seat and clamp said tubular extension in said tail center, said hollow center and tubular extension housing the broach prior to the broaching operation.

2. The combination in a work holder as set forth in claim 1, in which the tubular extension is seated and secured in said tail center by a hand lever having a link connection to said slidable carriage and having a toggle action on said tubular extension.

3. In a work holder for a broaching machine, a hollow tail center movable axially in said work holder to engage and center the work when the latter is in broaching position only, a slidable carriage for said tail center, a tubular extension insertable in the rear end of said tail center, means to seat and clamp said tubular extension in said tail center, and means to support said tubular extension for transverse displacement relative to said tail center when withdrawn therefrom.

4. In a work holder for a broaching machine, a hollow tail center, a carriage for said tail center, means to move said carriage to advance and seat said tail center against the end of a piece of tubular work, a removable rear tubular extension for said hollow tail center, means to seat said extension in said tail center to seal the rear end thereof, and means to supply lubricant to the tubular work and broach through said hollow tail center.

5. A work holder for a broaching machine comprising a supporting member, means to support a piece of tubular work and a broach return tube in parallel spaced positions in said supporting member, means to oscillate said supporting member to present said tubular work and said return tube alternately in the same operative position, a hollow tail center to support and center the work when the work is in broaching position only, said tail center being slidable along a fixed longitudinal axis which coincides with the axis of the work when the work is in broaching position, and means to supply lubricant to the tubular work and broach through said hollow tail center when thus positioned.

6. The combination in a work holder for a broaching machine as set forth in claim 5, in which the oscillating means comprises a hydraulic cylinder and piston having relative movement and a link connecting said supporting member to the movable hydraulic part for oscillation thereby between broaching and loading positions.

OLIVER W. BONNAFE.